United States Patent
Hama (10) Patent No.: US 12,390,936 B2
(45) Date of Patent: Aug. 19, 2025

(54) ROBOT IMAGE DISPLAY METHOD, RECORDING MEDIUM, AND ROBOT IMAGE DISPLAY SYSTEM

(71) Applicant: Seiko Epson Corporation, Tokyo (JP)

(72) Inventor: Hidenori Hama, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 273 days.

(21) Appl. No.: 17/720,417

(22) Filed: Apr. 14, 2022

(65) Prior Publication Data
US 2022/0331972 A1 Oct. 20, 2022

(30) Foreign Application Priority Data
Apr. 15, 2021 (JP) ................. 2021-068907

(51) Int. Cl.
*B25J 9/16* (2006.01)
*B25J 9/00* (2006.01)
*G05B 19/42* (2006.01)
*G06T 7/70* (2017.01)
*G06T 19/00* (2011.01)

(52) U.S. Cl.
CPC .......... *B25J 9/1697* (2013.01); *B25J 9/0081* (2013.01); *G05B 19/42* (2013.01); *G06T 7/70* (2017.01); *G06T 19/006* (2013.01); *G05B 2219/39451* (2013.01)

(58) Field of Classification Search
CPC ...... B25J 9/1697; B25J 9/0081; B25J 9/1671; B25J 13/06; B25J 9/1602; B25J 9/1664; G05B 19/42; G05B 2219/39451; G06T 7/70; G06T 19/006; G06T 2207/30204; G06T 7/74; G06T 19/00
See application file for complete search history.

(56) References Cited

U.S. PATENT DOCUMENTS

| | | | |
|---|---|---|---|
| 7,236,854 B2 * | 6/2007 | Pretlove | G05B 19/42 318/568.22 |
| 9,225,872 B2 * | 12/2015 | Inada | H04N 1/21 |
| 10,759,050 B2 * | 9/2020 | Mao | G05B 19/408 |
| 10,974,386 B2 * | 4/2021 | Shimodaira | B25J 9/1671 |
| 11,267,132 B2 * | 3/2022 | Okamoto | G06F 3/0346 |
| 11,400,583 B2 * | 8/2022 | Yamamoto | B25J 13/085 |

(Continued)

FOREIGN PATENT DOCUMENTS

| JP | H09-201784 A | 8/1997 |
|---|---|---|
| JP | H09-225872 A | 9/1997 |

(Continued)

*Primary Examiner* — Sihar A Karwan
(74) *Attorney, Agent, or Firm* — Harness, Dickey & Pierce, P.L.C.

(57) ABSTRACT

A robot image display method includes (a) a step of recognizing the position and the posture of a base of a robot from a base section image of a base section for teaching, (b) a step of recognizing the position and the posture of a finger section of the robot from a finger section image of a finger section for teaching, (c) a step of calculating angles of one or more joints of the robot from the position and the posture of the base and the position and the posture of the finger section, and (d) a step of displaying, in a virtual space, a three-dimensional image of the robot in a state in which the joints are at the angles calculated in the step (c).

10 Claims, 9 Drawing Sheets

(56) References Cited

U.S. PATENT DOCUMENTS

| | | | |
|---|---|---|---|
| 2004/0189631 A1* | 9/2004 | Kazi | G06T 19/006 |
| | | | 345/418 |
| 2007/0282485 A1* | 12/2007 | Nagatsuka | G05B 19/4069 |
| | | | 700/245 |
| 2014/0236565 A1* | 8/2014 | Kuwahara | B25J 9/1671 |
| | | | 703/22 |
| 2015/0290795 A1* | 10/2015 | Oleynik | B25J 9/0081 |
| | | | 700/257 |
| 2016/0046023 A1* | 2/2016 | Nagendran | B25J 9/1605 |
| | | | 700/258 |
| 2016/0257000 A1* | 9/2016 | Guerin | B25J 9/1671 |
| 2017/0165841 A1* | 6/2017 | Kamoi | B25J 9/1671 |
| 2018/0004188 A1* | 1/2018 | Yamaguchi | B25J 9/16 |
| 2018/0281197 A1* | 10/2018 | Shiraishi | B25J 9/1669 |
| 2020/0171671 A1* | 6/2020 | Huang | B25J 9/0084 |
| 2021/0069899 A1* | 3/2021 | Wittmann | B25J 9/1671 |
| 2023/0031913 A1* | 2/2023 | Ishikawa | G06T 19/006 |
| 2023/0311323 A1* | 10/2023 | Szabó | B25J 9/1671 |
| | | | 700/246 |

FOREIGN PATENT DOCUMENTS

| | | |
|---|---|---|
| JP | 2017-104944 A | 6/2017 |
| JP | 2020-185631 A | 11/2020 |
| WO | 2019/046559 A1 | 3/2019 |

* cited by examiner

ROBOT MODEL SELECTION — WS1

| | MODEL NAME | NUMBER OF AXES | MAXIMUM REACH | WEIGHT CAPACITY |
|---|---|---|---|---|
| ■ | C1 | 6 | 600mm | 3kg |
| ☐ | C2 | 6 | 900mm | 3kg |
| ☐ | C3 | 6 | 1200mm | 3kg |
| ☐ | D1 | 6 | 450mm | 5kg |
| ☐ | D2 | 6 | 800mm | 5kg |
| ☐ | D3 | 6 | 1000mm | 5kg |

PLEASE PRESS A BUTTON TO SELECT AND PRESS B BUTTON TO DETERMINE

FIG. 9

ROBOT MODEL SELECTION — WS1

| | MODEL NAME | NUMBER OF AXES | MAXIMUM REACH | WEIGHT CAPACITY | |
|---|---|---|---|---|---|
| ☐ | C1 | 6 | 600mm | 3kg | NOT SELECTABLE |
| ■ | C2 | 6 | 900mm | 3kg | |
| ☐ | C3 | 6 | 1200mm | 3kg | |
| ☐ | D1 | 6 | 450mm | 5kg | NOT SELECTABLE |
| ☐ | D2 | 6 | 800mm | 5kg | |
| ☐ | D3 | 6 | 1000mm | 5kg | |

PLEASE PRESS A BUTTON TO SELECT AND PRESS B BUTTON TO DETERMINE

ID DISPLAY METHOD, RECORDING MEDIUM, AND ROBOT IMAGE DISPLAY SYSTEM

The present application is based on, and claims priority from JP Application Serial Number 2021-068907, filed Apr. 15, 2021, the disclosure of which is hereby incorporated by reference herein in its entirety.

BACKGROUND

1. Technical Field

The present disclosure relates to a robot image display method, a recording medium, and a robot image display system.

2. Related Art

JP-A-2017-104944 (Patent Literature 1) discloses a robot system that, even if an end effector or a robot peripheral device of a robot is absent, can carry out robot teaching work regarding that the end effector or the robot peripheral device is present. This system superimposes and displays a virtual image of the end effector or the robot peripheral device of the robot on a real image of the robot photographed by a camera.

However, in the related art, in order to perform teaching of the robot, it is necessary to actually set the robot and cause a robot arm to actually operate.

SUMMARY

According to a first aspect of the present disclosure, there is provided a robot image display method. The display method includes: (a) a step of acquiring a base section image created by photographing a base section for teaching for teaching a position and a posture of a base of a robot and of recognizing the position and the posture of the base from the base section image; (b) a step of acquiring a finger section image created by photographing a finger section for teaching for teaching a position and a posture of a finger section of the robot and of recognizing the position and the posture of the finger section from the finger section image; (c) a step of calculating angles of joints of the robot from the position and the posture of the base recognized in the step (a) and the position and the posture of the finger section recognized in the step (b); and (d) a step of displaying, in a virtual space, a three-dimensional image of the robot represented by the angles of the joints calculated in the step (c).

According to a second aspect of the present disclosure, there is provided a computer program for performing display processing for a robot image. The computer program causes a processor to execute: (a) processing for acquiring a base section image created by photographing a base section for teaching for teaching a position and a posture of a base of a robot and for recognizing the position and the posture of the base from the base section image; (b) processing for acquiring a finger section image created by photographing a finger section for teaching for teaching a position and a posture of a finger section of the robot and for recognizing the position and the posture of the finger section from the finger section image; (c) processing for calculating angles of joints of the robot from the position and the posture of the base recognized in the processing (a) and the position and the posture of the finger section recognized in the processing (b); and (d) processing for displaying, in a virtual space, a three-dimensional image of the robot represented by the angles of the joints calculated in the processing (c).

According to a third aspect of the present disclosure, there is provided a display system for a robot image. The display system includes: a base section for teaching for teaching a position and a posture of a base of a robot; a finger section for teaching for teaching a position and a posture of a finger section of the robot; a photographing section for photographing the base section for teaching and the finger section for teaching; and a control section connected to the photographing section. The control section executes: (a) processing for acquiring a base section image created by photographing the base section for teaching using the photographing section and for recognizing the position and the posture of the base from the base section image; (b) processing for acquiring a finger section image created by photographing the finger section for teaching using the photographing section and for recognizing the position and the posture of the finger section from the finger section image; (c) processing for calculating angles of joints of the robot from the position and the posture of the base recognized in the processing (a) and the position and the posture of the finger section recognized in the processing (b); and (d) processing for displaying, in a virtual space, a three-dimensional image of the robot represented by the angles of the joints calculated in the processing (c).

DESCRIPTION OF EXEMPLARY EMBODIMENTS

Figure 1:
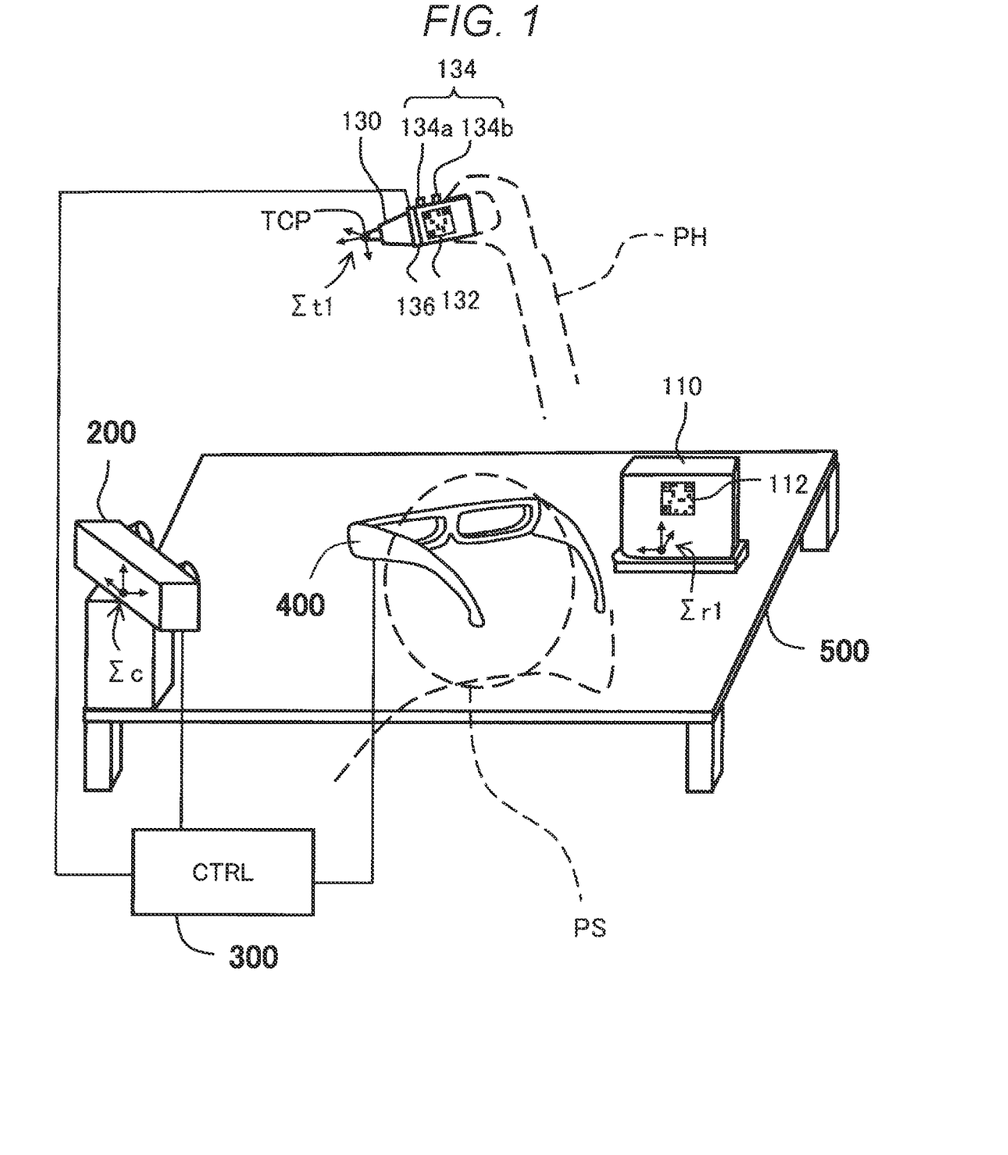
FIG. 1 is an explanatory diagram showing a teaching system for a robot in an embodiment.

FIG. 1 is an explanatory diagram showing a teaching system for a robot in an embodiment. The teaching system includes a base section for teaching 110, a finger section for teaching 130, an imaging section 200, a control device 300, and AR (Augmented Reality) glasses 400. In this example, the base section for teaching 110 is set on a table 500. The finger section for teaching 130 is held by a hand PH of an operator PS. The AR glasses 400 are worn on the head of the operator PS. For convenience of illustration, the operator PS is indicated by a broken line. The finger section for teaching 130, the imaging section 200, and the AR glasses 400 are connected to the control device 300 by wire or radio. The control device 300 is equivalent to the "control section" in the present disclosure.

The base section for teaching 110 is a member for teaching the position and the posture of a base of the robot. A base section coordinate system $\Sigma r1$ having a predetermined reference point of the base section for teaching 110 as the origin is set in the base section for teaching 110. The finger section for teaching 130 is a member for teaching the position and the posture of a finger section of the robot. A control point TCP (Tool Center Point) is set in the finger section for teaching 130. A finger section coordinate system $\Sigma t1$ having a predetermined reference point as the origin is set in the finger section for teaching 130. In this example, the origin of the finger section coordinate system $\Sigma t1$ is the control point TCP. The teaching system has one characteristic in that the teaching system teaches the movement of the robot using the base section for teaching 110 and the finger section for teaching 130 without using a real machine of the robot. More specifically, first, the teaching system sets the positions of the base section for teaching 110 and the finger section for teaching 130 and, thereafter, photographs images of the base section for teaching 110 and the finger section for teaching 130 with the imaging section 200, recognizes the positions and the postures of the base and the finger section of the robot using the images, and calculates angles of joints of the robot. Detailed content of this processing is explained below.

The imaging section 200 photographs images of the base section for teaching 110 and the finger section for teaching 130. As the imaging section 200, a stereo camera, an optical ranging device such as Lidar (Laser Imaging Detection and Ranging), a monocular camera, and the like can be used. When the optical ranging device is used, it is preferable to use the monocular camera together with the optical ranging device. Then, there is an advantage that it is possible to accurately calculate, from a distance image obtained by the optical ranging device and a two-dimensional image photographed by the monocular camera, distances in positions in the two-dimensional image. In the imaging section 200, a camera coordinate system $\Sigma c$ having a predetermined reference point of the imaging section 200 as the origin is set. As shown in FIG. 1, the imaging section 200 is set above the table 500. However, the imaging section 200 may be attached to an upper part of the AR glasses 400.

Figure 2:
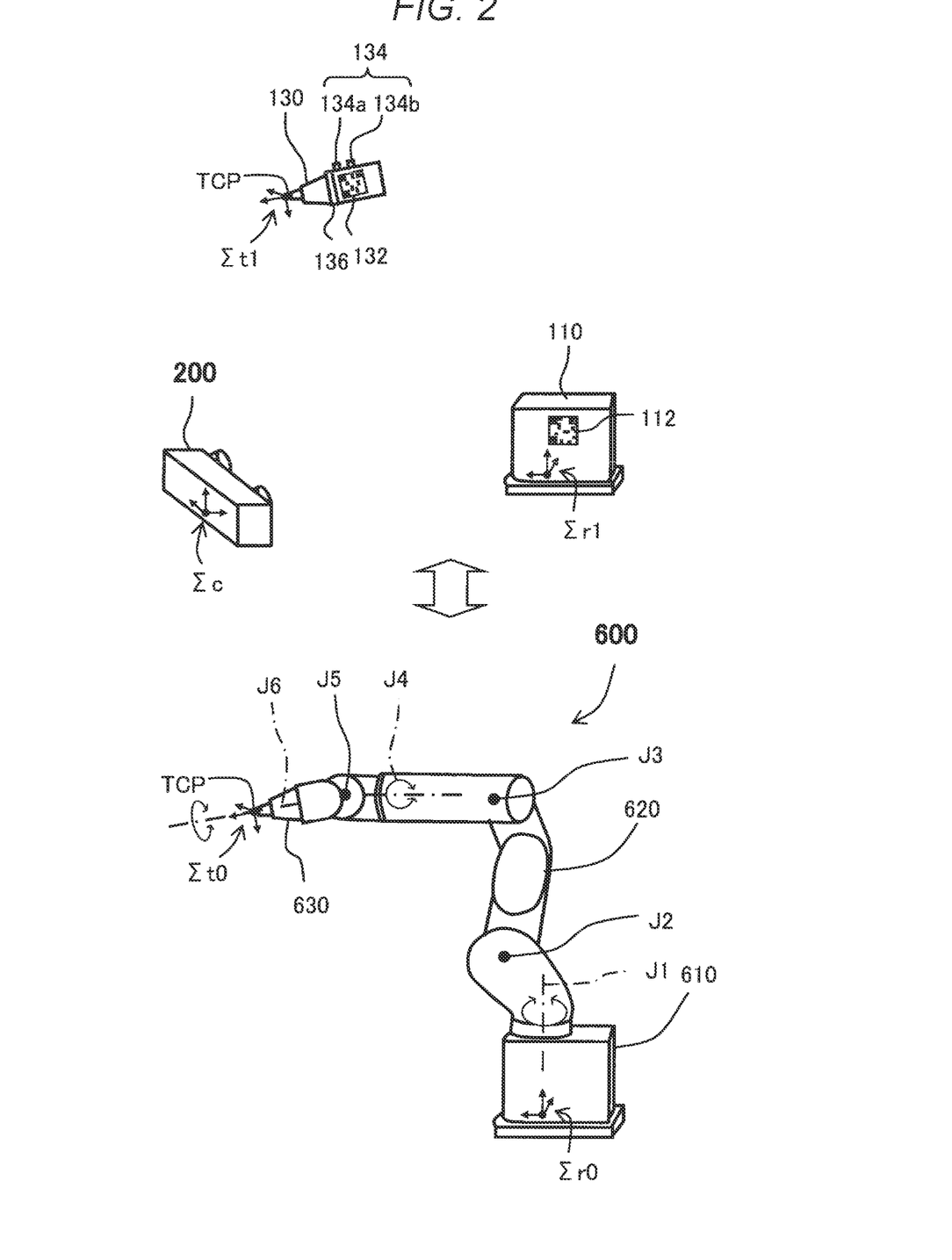
FIG. 2 is an explanatory diagram showing a base section for teaching and a finger section for teaching and the robot in comparison with each other.

FIG. 2 is an explanatory diagram showing the base section for teaching 110 and the finger section for teaching 130 and a real machine robot 600 in comparison with each other. The robot 600 includes a base 610 and a robot arm 620 and includes a finger section 630 at the distal end of the robot arm 620. The finger section 630 may include an end effector or may be a portion not including an end effector such as a hand and provided with a tool flange for attaching the end effector. The end effector is sometimes called "tool". In this embodiment, the robot arm 620 is coupled sequentially by a plurality of joints J1 to J6. As the robot 600, a robot including any arm mechanism including two or more joints can be used. The robot 600 in this embodiment is a vertical articulated robot. However, a horizontal articulated robot may be used.

In the base 610 of the robot 600, a robot coordinate system $\Sigma r0$ having a predetermined reference point of the base 610 as the origin is set. The robot coordinate system $\Sigma r0$ is associated with the base section coordinate system $\Sigma r1$ set in the base section for teaching 110. In the finger section 630, a control point TCP (Tool Center Point) is set. In the finger section 630 of the robot 600, a finger section coordinate system $\Sigma t0$ having a predetermined reference point as the origin is set. In an example shown in FIG. 2, the origin of the finger section coordinate system $\Sigma t0$ is the control point TCP. The finger section coordinate system $\Sigma t0$ is associated with the finger section coordinate system $\Sigma t1$ set in the finger section for teaching 130. The finger section coordinate system $\Sigma t0$ may be set with a position other than the control point TCP as the origin. For example, the finger section coordinate system $\Sigma t0$ may be set with a reference point of the tool flange at the distal end of the robot arm 620 as the origin. The same applies to the finger section coordinate system $\Sigma t1$ set in the finger section for teaching 130.

The base section for teaching 110 is a member for recognizing the position and the posture of the base 610 of the robot 600. In this example, the base section for teaching 110 has substantially the same shape as the base 610 of the robot 600. However, the base section for teaching 110 having any shape can be used. The base section for teaching 110 can be formed using a plate made of metal or plastic or any material such as paper.

A first mark 112 formed by a two-dimensional code is set on the surface of the base section for teaching 110. The first mark 112 is used to recognize the position and the posture of the base section for teaching 110 from an image of the base section for teaching 110. The position and the posture of the base section for teaching 110 mean the position and the posture of the base section coordinate system $\Sigma r1$ in the camera coordinate system $\Sigma c$. For example, the first mark 112 can be formed as a black and white pattern including data representing the position and the posture of the base section coordinate system $\Sigma r1$ in the camera coordinate system $\Sigma c$. As explained above, the base section coordinate system $\Sigma r1$ set in the base section for teaching 110 corresponds to the robot coordinate system $\Sigma r0$ set in the base 610 of the robot 600. Therefore, the position and the posture of the base section for teaching 110 recognized from the image of the base section for teaching 110 can be regarded the same as the position and the posture of the base 610 of the robot 600. In general, the position is represented by three coordinate values and the posture is represented by a 3×3 rotation matrix, a quaternion, or the like. The position and the posture can be represented by a 4×4 homogeneous transformation matrix as well.

The first mark 112 is not limited to the two-dimensional code. For example, a projection, a recess, a light emitting section, or a printed pattern can be used. Then, the position and the posture of the base section for teaching 110 can be easily recognized from an image of the first mark 112. It is preferable to provide the first mark 112 on a plurality of surfaces of the base section for teaching 110. However, when the position and the posture of the base section for teaching 110 can be recognized from the shape of the base section for teaching 110, the first mark 112 can be omitted. In this case, it is preferable to adopt a shape without symmetry as the shape of the base section for teaching 110. The base 610 of the real machine robot 600 may be used as the base section for teaching 110.

The finger section for teaching 130 is a member for recognizing the position and the posture of the finger section 630 of the robot 600. In this example, the finger section for teaching 130 has a shape similar to the shape of the finger section 630 of the robot 600. However, the finger section for teaching 130 having any shape can be used. The finger section for teaching 130 can be formed using a plate made of metal or plastic or any material such as paper.

A second mark 132 formed by a two-dimensional mark is set on the surface of the finger section for teaching 130. The second mark 132 is used to recognize the position and the posture of the finger section for teaching 130 from an image of the finger section for teaching 130. The position and the posture of the finger section for teaching 130 mean the position and the posture of the finger section coordinate system $\Sigma t1$ in the camera coordinate system $\Sigma c$. For example, the second mark 132 can be formed as a black and white pattern including data representing the position and the posture of the finger section coordinate system $\Sigma t1$ in the camera coordinate system $\Sigma c$. As explained above, the finger section coordinate system $\Sigma t1$ set in the finger section for teaching 130 corresponds to the finger section coordinate system $\Sigma t0$ set in the finger section 630 of the robot 600. Therefore, the position and the posture of the finger section for teaching 130 recognized from the image of the finger section for teaching 130 can be regarded the same as the position and the posture of the finger section 630 of the robot 600.

The second mark 132 is not limited to the two-dimensional code. For example, a projection, a recess, a light emitting section, or a printed pattern can be used. Then, the position and the posture of the finger section for teaching 130 can be easily recognized from an image of the second mark 132. It is preferable to provide the second mark 132 on a plurality of surfaces of the finger section for teaching 130. However, when the position and the posture of the finger section for teaching 130 can be recognized from the shape of the finger section for teaching 130, the second mark 132 can be omitted. In this case, it is preferable to adopt a shape without symmetry as the shape of the finger section for teaching 130. The finger section 630 of the real machine robot 600 may be used as the finger section for teaching 130.

The finger section for teaching 130 further includes buttons 134 and a force detecting section 136. In this embodiment, the buttons 134 include two buttons, that is, an A button 134a and a B button 134b. The buttons 134 can be used to set a teaching point and a route, change a model of the robot, and change joint angles of the robot. For example, to set the teaching point, when the operator PS presses one of the buttons 134, the position and the posture of the finger section for teaching 130 at a point in time of the pressing of the button are registered as the teaching point. To set the route, when the operator PS moves the finger section for teaching 130 while pressing one of the buttons 134, a route of the movement of the finger section for teaching 130 is registered. The change of the joint angles is explained below. It is preferable to provide one or more buttons in the finger section for teaching 130. However, the buttons 134 may be omitted. In this case, an instruction of the operator PS may be given to the control device 300 using a gesture such as a movement of a finger of the operator PS. In this case, it is possible to photograph the gesture of the operator PS with the AR glasses 400 or the imaging section 200 and recognize the instruction of the operator PS with the control device 300 according to the movement.

The force detecting section 136 is a sensor that measures an external force applied to the finger section for teaching 130. As the force detecting section 136, for example, a six-axis force sensor can be used. The force detecting section 136 may be omitted.

Other components such as a display section that displays a teaching state, a switch for generating an enable signal, and a sensor such as a gyroscope for improving recognition accuracy of the position and the posture of the finger section for teaching 130 may be provided in the finger section for teaching 130. The same hand as a hand of a real machine robot may be used as the finger section for teaching 130. Alternatively, a wrist section of the real machine robot detached from the robot may be used as the finger section for teaching 130. In the latter case, the finger section for teaching 130 does not include a portion equivalent to the end effector.

Figure 3:
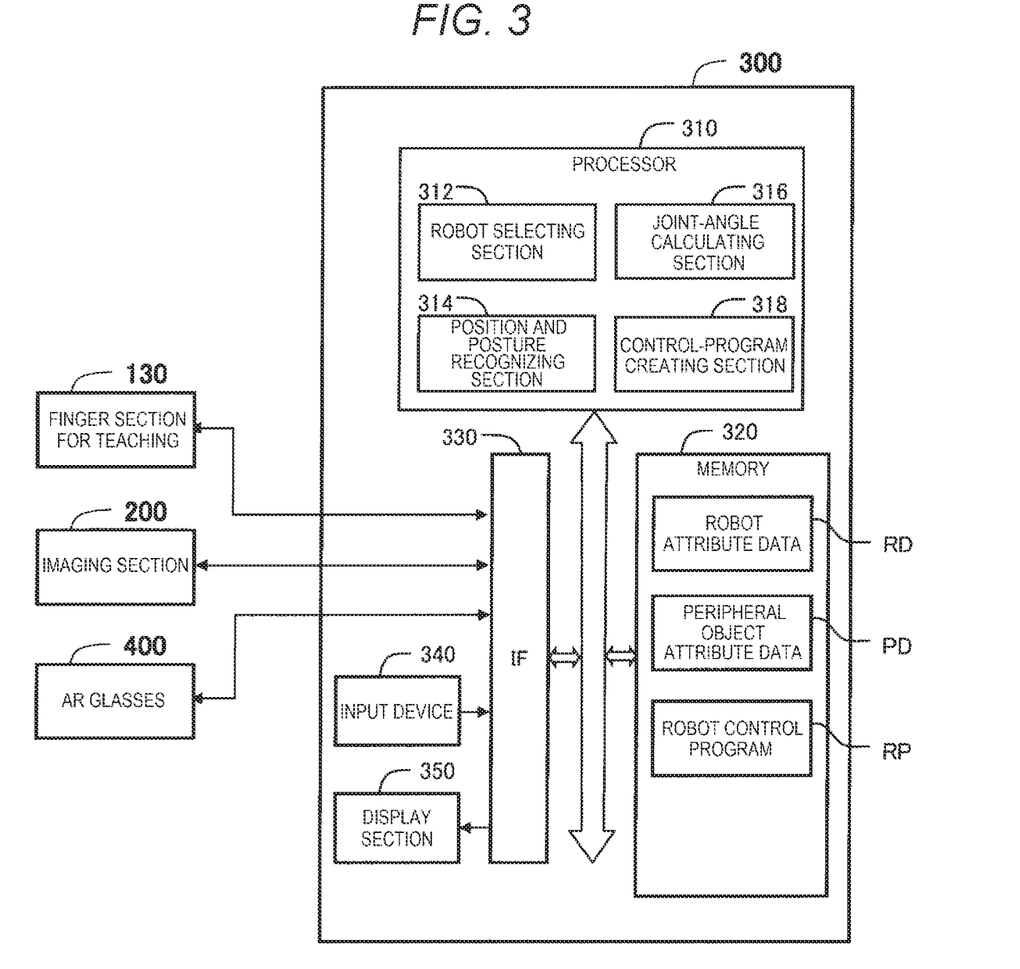
FIG. 3 is a functional block diagram of a control device.

FIG. 3 is a block diagram showing functions of the control device 300. The control device 300 can be realized as an information processing device such as a personal computer. The control device 300 includes a processor 310, a memory 320, an interface circuit 330, and an input device 340 and a display section 350 coupled to the interface circuit 330. The finger section for teaching 130, the imaging section 200, and the AR glasses 400 are further coupled to the interface circuit 330 by wire or radio. However, when electric components such as the buttons 134 and the force detecting section 136 are not provided in the finger section for teaching 130, the finger section for teaching 130 may not be connected to the control device 300.

The processor 310 includes functions of a robot selecting section 312, a position and posture recognizing section 314, a joint-angle calculating section 316, and a control-program creating section 318. The robot selecting section 312 is used to select one model set as a target of teaching processing from a plurality of models of the robot 600. The position and posture recognizing section 314 recognizes the position and the posture of the base 610 and the position and the posture of the finger section 630 of the robot 600 from an image obtained by photographing the base section for teaching 110 and the finger section for teaching 130 with the imaging section 200. The joint-angle calculating section 316 calculates angles of joints of the robot 600 from the position and the posture of the base 610 and the position and the posture of the finger section 630 recognized by the position and posture recognizing section 314. The control-program creating section 318 creates a control program for the robot 600 using the joint angles calculated by the joint-angle calculating section 316. The functions of the sections 312, 314, 316, and 318 are realized by the processor 310 executing a computer program stored in the memory 320. However, a part or all of the functions of the sections may be realized by a hardware circuit.

In the memory 320, robot attribute data RD, peripheral object attribute data PD, and a robot control program RP are stored. The robot attribute data RD includes, concerning the plurality of models of the robot 600, various robot characteristics such as the configuration and a movable range of the robot arm 620. The robot attribute data RD preferably includes three-dimensional data representing a three-dimensional shape of the robot 600 in order to display a three-dimensional image of the robot 600 in augmented reality using the AR glasses 400. The peripheral object attribute data PD includes three-dimensional data representing a three-dimensional shape of a peripheral object present around the robot 600. As the peripheral object, for example, a stand, a shelf, a wall, and a parts feeder can be used. The peripheral object attribute data PD may include data representing the shape and the weight of a workpiece treated by the robot 600. The robot control program RP is formed by a plurality of instructions for causing the robot 600 to operate. The robot control program RP is created by teaching processing explained below.

Figure 4:
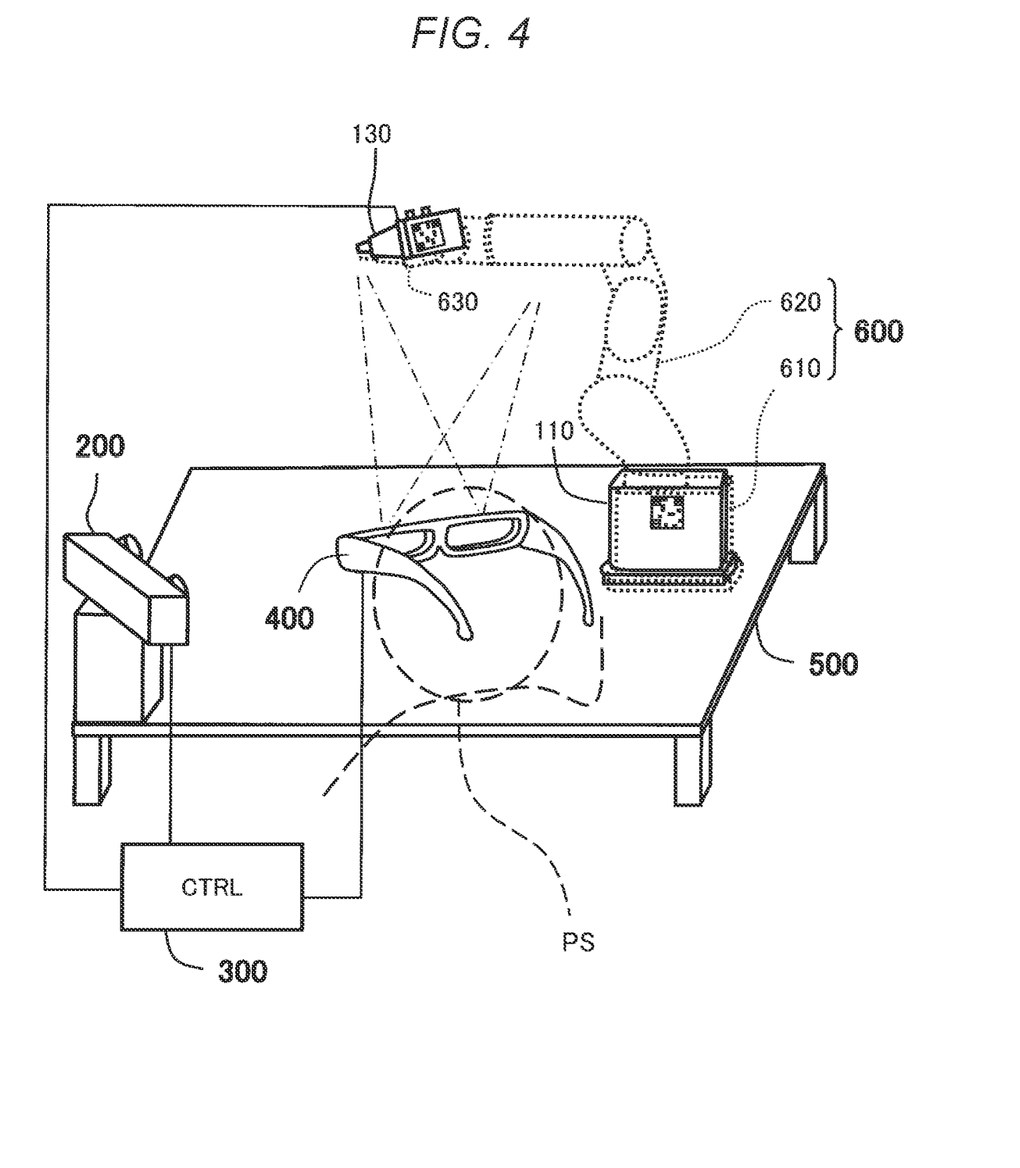
FIG. 4 is an explanatory diagram showing how a robot is displayed in augmented reality in a state shown in FIG. 1.

FIG. 4 is an explanatory diagram showing how the robot 600 is displayed as augmented reality in a state shown in FIG. 1. A three-dimensional image of the robot 600 is displayed in a superimposed manner on the base section for teaching 110 and the finger section for teaching 130 by the AR glasses 400. More specifically, the three-dimensional image of the robot 600 is displayed such that an image of the base 610 is arranged according to the position and the posture of the base 610 recognized using the base section for teaching 110 and an image of the finger section 630 is arranged according to the position and the posture of the finger section 630 recognized using the finger section for teaching 130. In an example shown in FIG. 4, for convenience of illustration, display positions of the base 610 and the finger section 630 of the robot 600 are drawn as positions slightly deviating from the positions of the base section for teaching 110 and the finger section for teaching 130. When the shape of the wrist section not including the end effector is used as the shape of the finger section for teaching 130, it is preferable to display the end effector as augmented reality as well. It is preferable that a form of the end effector can be switched by moving a movable section of the end effector in a virtual space using one of the buttons 134. The "virtual space" means an artificial environment created by a computer.

Figure 5:
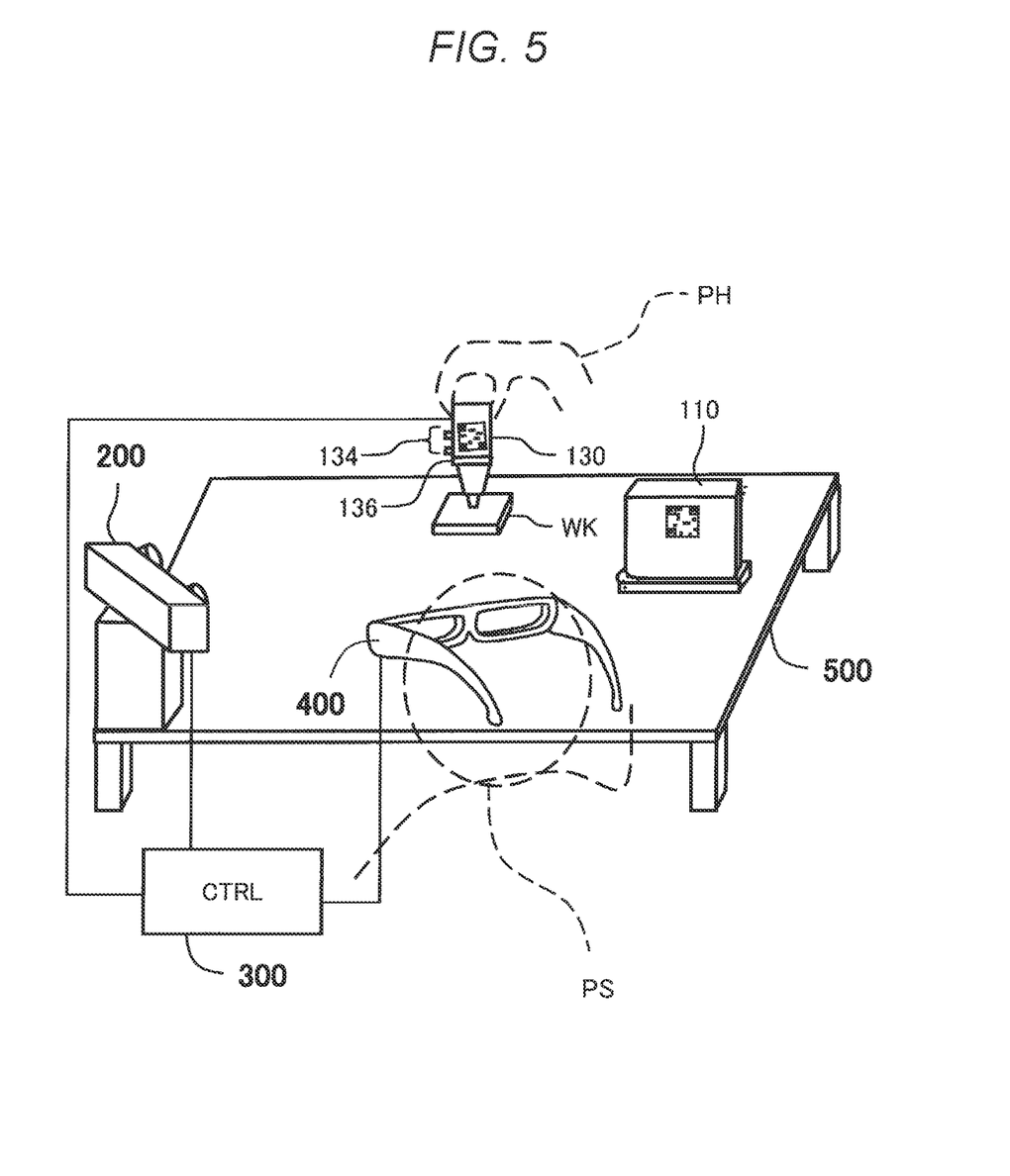
FIG. 5 is an explanatory diagram showing another example in which teaching is performed using the teaching system.
Figure 6:
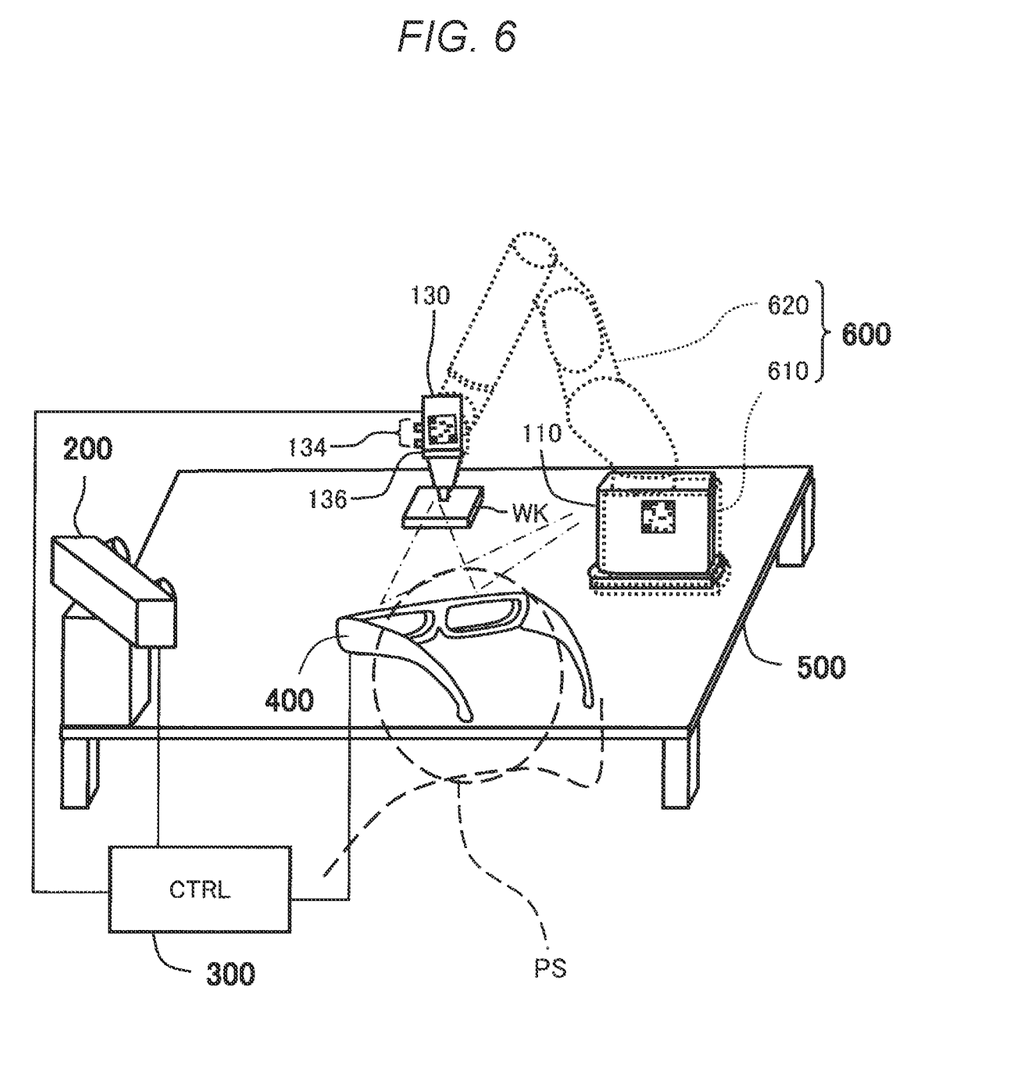
FIG. 6 is an explanatory diagram showing how the robot is displayed in augmented reality in a state shown in FIG. 5.

FIG. 5 is an explanatory diagram showing another example in which teaching is performed using the teaching system. FIG. 6 is an explanatory diagram showing how the robot 600 is displayed in augmented reality in a state shown in FIG. 5. In these examples, the distal end of the finger section for teaching 130 is pressed against a workpiece WK. In this state, when the operator PS presses one of the buttons 134, the base section for teaching 110 and the finger section for teaching 130 are photographed by the imaging section 200 and force detected by the force detecting section 136 is supplied to the control device 300. Then, it is possible to simultaneously set preferable force when setting a teaching point. In this case, since the finger section for teaching 130 is held by the hand of the operator PS, it is possible to more easily set the magnitude of the preferable force compared with when force is input as a numerical value in Newton unit. The setting of such preferable force is performed, for example, when the workpiece WK includes a button and a test for pressing the button of the workpiece WK is executed using the robot 600. Alternatively, when a polishing member is provided in the finger section 630 to polish the workpiece WK as well, setting of force is performed.

Figure 7:
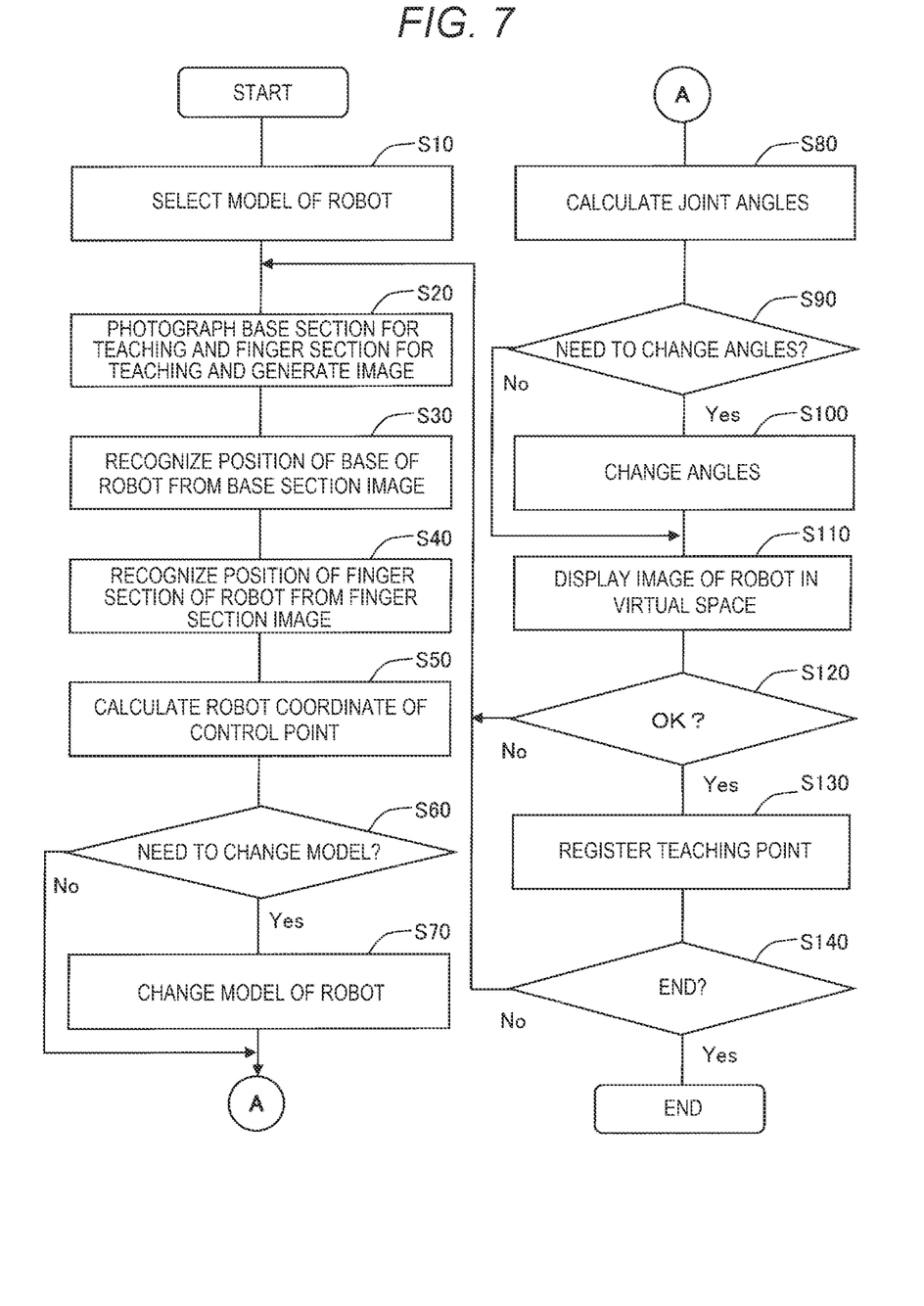
FIG. 7 is a flowchart showing a procedure of teaching processing in the embodiment.

FIG. 7 is a flowchart showing a procedure of teaching processing in the embodiment. In step S10, the processor 310 selects a model of the robot 600 using the function of the robot selecting section 312.

Figure 8:
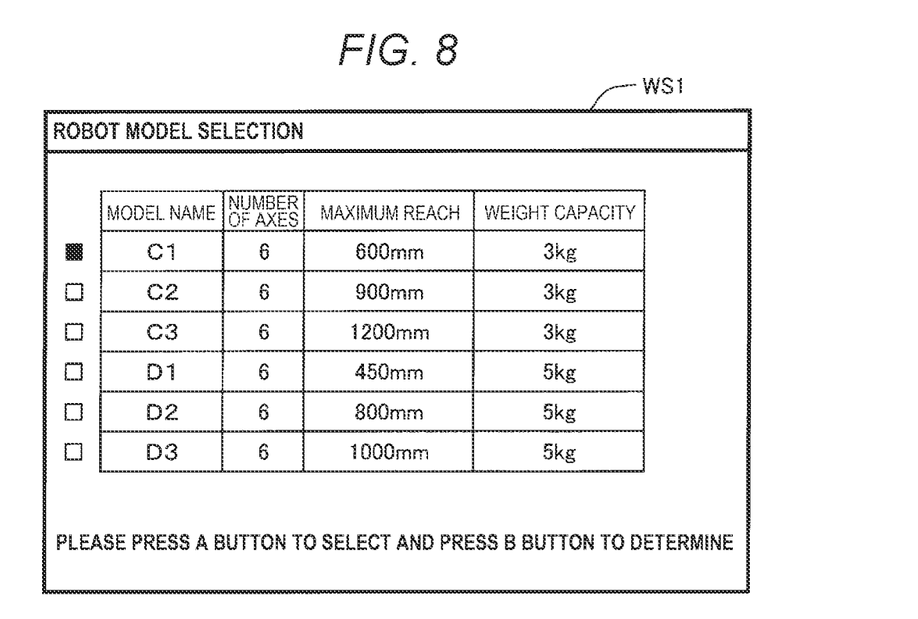
FIG. 8 is an explanatory diagram showing a robot model selection screen.

FIG. 8 is an explanatory diagram showing a robot model selection screen WS1. In this embodiment, the selection screen WS1 is displayed as augmented reality according to image data supplied from the robot selecting section 312 to the AR glasses 400. On the selection screen WS1, a plurality of models of robots are arrayed as choices. In the models, besides a model name, the number of axes, a maximum reach, and a weight capacity are shown as attributes of the robots. However, a part or all of the attributes of the robots may be omitted. Images of the models may be displayed. The operator PS can select a model using the buttons 134 provided in the finger section for teaching 130. That is, the operator PS can select one of the plurality of models by pressing the A button 134a and determine the model by pressing the B button 134b. In a state shown in FIG. 8, a robot with a model name "C1" is selected. A result of the selection by the operator PS is received by the robot selecting section 312. The operator PS may directly designate a model name to thereby select a model instead of using the selection screen WS1.

In step S20 in FIG. 7, the position and posture recognizing section 314 photographs the base section for teaching 110 and the finger section for teaching 130 using the imaging section 200 and generates a base section image and a finger section image. Step S20 is started by the operator PS pressing one of the buttons 134, for example, the A button 134a of the finger section for teaching 130. The imaging section 200 preferably has a sufficiently wide angle of view to be able to simultaneously photograph the base section for teaching 110 and the finger section for teaching 130. The base section image and the finger section image may be the same image. Alternatively, in an image photographed by the imaging section 200, an image portion including the base section for teaching 110 may be extracted as the base section image and another image portion including the finger section for teaching 130 may be extracted as the finger section image. The base section image and the finger section image may be separately photographed. The base section image and the finger section image are temporarily stored in the memory 320. The imaging section 200 may photograph a moving image. When the operator PS desires to set a path rather than registering a teaching point, in step S20, the imaging section 200 photographs a moving image of the moving finger section for teaching 130.

In step S30, the position and posture recognizing section 314 acquires the base section image obtained in step S20 from the memory 320 and recognizes the position of the base 610 of the robot 600 from the base section image. In this embodiment, as shown in FIG. 2, the position and the posture of the base section coordinate system $\Sigma r1$ in the camera coordinate system $\Sigma c$ are recognized from an image of the first mark 112 provided in the base section for teaching 110. The position and the posture of the base section coordinate system $\Sigma r1$ can be regarded as the position and the posture of the base 610 of the robot 600, that is, the position and the posture of the robot coordinate system $\Sigma r0$.

In step S40, the position and posture recognizing section 314 acquires the finger section image obtained in step S20 from the memory 320 and recognizes the position of the finger section 630 of the robot 600 from the finger section image. In this embodiment, as shown in FIG. 2, the position and the posture of the finger section coordinate system $\Sigma t1$ in the camera coordinate system $\Sigma c$ are recognized from an image of the second mark 132 provided in the finger section for teaching 130. The position and the posture of the finger section coordinate system $\Sigma t1$ can be regarded as the position and the posture of the finger section 630 of the robot 600, that is, the position and the posture of the finger section coordinate system $\Sigma t0$.

In step S50, the position and posture recognizing section 314 calculates a robot coordinate of the control point TCP of the finger section 630 from the position and posture of the base 610 and the position and the posture of the finger section 630 of the robot 600. The robot coordinate of the control point TCP is represented by the position and the posture of the finger section coordinate system $\Sigma t0$ in the robot coordinate system $\Sigma r0$.

In step S60, the robot selecting section 312 determines whether the model of the robot 600 needs to be changed. Specifically, when the robot coordinate of the control point TCP calculated in step S50 is within a movable range in the currently selected model of the robot 600, the robot selecting section 312 determines that the model does not need to be changed. On the other hand, when the robot coordinate of the control point TCP is outside the movable range, the robot selecting section 312 determines that the model needs to be changed. When the model does not need to be changed, the processor 310 proceeds to step S80 explained below. When the model needs to be changed, the processor 310 proceeds to step S70. In step S70, the processor 310 changes the model of the robot 600 using the function of the robot selecting section 312.

Figure 9:
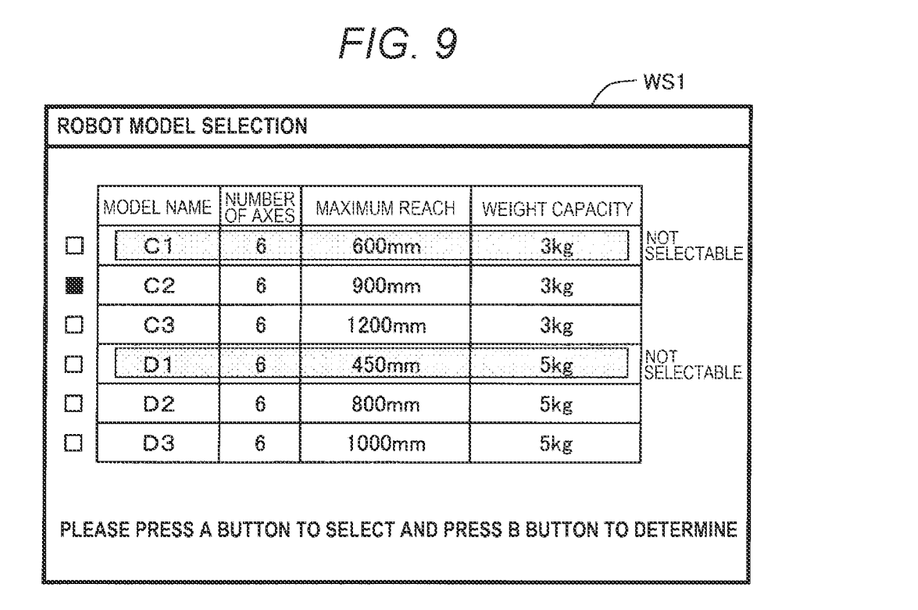
FIG. 9 is an explanatory diagram showing how a model of a robot is changed.

FIG. 9 is an explanatory diagram showing how the type of the robot is changed using the robot model selection screen WS1. In FIG. 9, among the plurality of models, "C1" and "D1" are models in which the robot coordinate of the control point TCP is outside the movable range. The models "C1" and "D1" are displayed such that the operator PS can visually recognize that the models "C1" and "D1" are ineffective choices that cannot be selected. In an example shown in FIG. 9, the models "C1" and "D1" are hatched. Boxes for selection of the models "C1" and "D1" cannot be selected either. The other models are presented as a list of effective choices that can be selected. The operator PS can change the model of the robot 600 by selecting one out of the effective choices. In the example shown in FIG. 9, a model "C2" is selected as a model after the change. In this way, when the control point TCP of the finger section 630 is outside the movable range, it is possible to put the control point TCP within the movable range of the robot 600 by changing the model of the robot 600. A plurality of effective choices do not need to be displayed. However, it is preferable that one or more effective choices are displayed. The control point TCP determined whether being outside the movable range does not have to be only the control point TCP calculated in step S50. For example, the control point TCP stored before step S50, that is, the control point TCP stored in teaching processing in the past may be added. In this case, among the plurality of models, a model in which at least one of a plurality of control points TCP is outside the movable range may be determined as an ineffective choice that cannot be selected and may be hatched.

In this way, in step S70, as the model of the robot 600, one or more models in which the position of the control point TCP in the robot coordinate system Σr0 is within the movable range of the robot 600 are presented to the operator PS. A model selected out of the one or more models by the operator PS is adopted. Then, the model of the robot 600 can be easily changed. The operator PS may change the model by directly designating a model name instead of using the selection screen WS1.

In step S80, the joint-angle calculating section 316 calculates angles of the joints of the robot 600 from the position and the posture of the control point TCP in the robot coordinate system Σr0. The calculation is executed according to inverse kinematics. In general, as a combination of the angles of the joints calculated by the inverse kinematics, a plurality of combinations are often possible. In this case, in step S80, one combination is selected out of the plurality of combinations according to a predetermined rule.

In step S90, the joint-angle calculating section 316 determines whether the joint angles need to be changed. In this embodiment, when the shape of the robot arm 620 represented by the angles of the joints is in an interference state in which the shape of the robot arm 620 is likely to interfere with a peripheral object in a virtual space, the joint-angle calculating section 316 determines that the joint angles need to be changed. The external shape of the peripheral object is represented by three-dimensional data included in the peripheral object attribute data PD stored in the memory 320. The joint-angle calculating section 316 is capable of calculating a distance between the external shape of the peripheral object represented by the three-dimensional data of the peripheral object and the shape of the robot arm 620 represented by the joint angles calculated in step S80, when the distance is equal to or smaller than a predetermined threshold, determining that the shape of the robot arm 620 is in the interference state, and determining that the joint angles need to be changed. As the threshold, for example, a value equal to or larger than 0 and equal to or smaller than 10 cm is set. When the peripheral object and the shape of the robot arm 620 are not in the interference state in the virtual space, the joint-angle calculating section 316 determines that the joint angles do not need to be changed. When the shape of the robot arm 620 is in the interference state in which the shape of the robot arm 620 is likely to interfere with the peripheral object, the joint-angle calculating section 316 may notify an alert indicating that the shape of the robot arm 620 is in the interference state to the operator PS. When the joint angles do not need to be changed, the processor 310 proceeds to step S110 explained below. When the joint angles need to be changed, the processor 310 proceeds to step S100. In step S100, the processor 310 changes the joint angles of the robot 600 using the function of the joint-angle calculating section 316.

Figure 10:
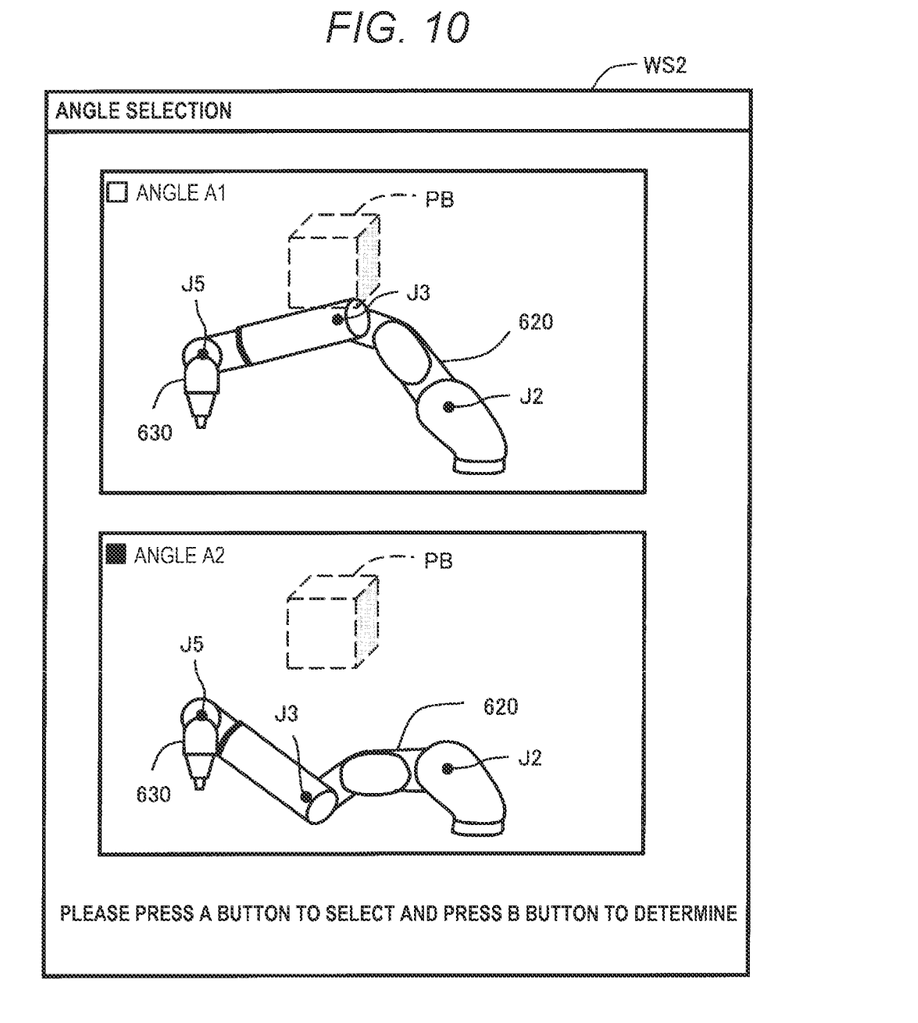
FIG. 10 is an explanatory diagram showing a screen for changing joint angles of the robot.

FIG. 10 is an explanatory diagram showing a screen WS2 for changing the joint angles of the robot. In this embodiment, the screen WS2 is displayed as augmented reality according to image data supplied from the joint-angle calculating section 316 to the AR glasses 400. In this example, two choices are displayed as combinations of the joint angles. In an angle A1 and an angle A2, combinations of angles of three joints J2, J3, and J5 are different from one another but the position and the posture of the finger section 630 are the same. In the angle A1, the robot arm 620 is likely to interfere with a peripheral object PB. In the angle A2, the robot arm 620 is unlikely to interfere with the peripheral object PB. Therefore, in this example, the angle A2 is selected as a combination of the joint angles after the change. In this way, the joint angles can be changed by selecting one out of a plurality of choices concerning the combinations of the joint angles. Such a change of the joint angles is performed to maintain the position and the posture of the finger section 630. The change of the joint angles is performed according to an instruction of the operator PS. As a result, when the shape of the robot arm 620 is in the interference state in which the shape of the robot arm 620 is likely to interfere with the peripheral object PB in the virtual space, it is possible to eliminate the interference state by changing the joint angles. Instead of the operator PS selecting one of the choices, the joint-angle calculating section 316 may automatically determine a combination of the joint angles for eliminating the interference state.

The joint-angle calculating section 316 does not need to automatically perform the determination in step S90. Instead, when the operator PS designates necessity of a change of the joint angles, the joint-angle calculating section 316 may determine that the joint angles need to be changed. That is, the operator PS may view images of the robot arm 620 and the peripheral object PB and determine whether the shape of the robot arm 620 and the peripheral object PB are in the interference state. In this case as well, it is preferable that the operator PS selects combinations of the joint angles. Then, the operator PS can freely select a preferable state of the robot arm 620.

In step S110, the joint-angle calculating section 316 displays an image of the robot 600 in the virtual space. In this embodiment, the robot 600 is displayed as augmented reality according to image data supplied from the joint-angle calculating section 316 to the AR glasses 400. For example, as shown in FIGS. 4 and 6 referred to above, in a three-dimensional image of the robot 600, an image of the base

610 of the robot 600 is displayed in a superimposed manner on the base section for teaching 110 and an image of the finger section 630 of the robot 600 is displayed in a superimposed manner on the finger section for teaching 130.

In step S120, the operator PS determines whether a state of the robot 600 displayed in step S110 is appropriate as a teaching point. When the state of the robot 600 is inappropriate as the teaching point, the processor 310 return to step S20. The operator PS changes the position of the finger section for teaching 130 and, then, executes photographing of an image again. On the other hand, when the state of the robot 600 is appropriate as the teaching point, the processor 310 proceeds step S130.

In step S130, the control-program creating section 318 registers, as the teaching point, a state in which the image is photographed in step S20. Step S130 is started by the operator PS pressing one of the buttons 134, for example, the B button 134*b* of the finger section for teaching 130. The teaching point is registered in the robot control program RP in the memory 320. When the operator PS desires to set a path rather than registering the teaching point, that is, when the operator PS photographs a moving image, the control-program creating section 318 generates a plurality of still images from the moving image in time series order and records states of the still images as teaching points. The control-program creating section 318 generates a path from a plurality of teaching points recorded in this way.

In step S140, the operator PS determines whether the teaching processing has ended. When the teaching processing has not ended, the processor 310 returns to step S20. The operator PS changes the position of the finger section for teaching 130 and, then, executes photographing of an image again. On the other hand, when the teaching processing has ended, the processor 310 ends the processing shown in FIG. 7.

After the processing shown in FIG. 7, the processor 310 may execute, as a part of the teaching processing, processing for setting other setting items for the robot control program RP. After the teaching processing ends, the processor 310 may reproduce the operation of the robot 600 in the virtual space using the robot control program RP created by the teaching processing. For example, when work for conveying a workpiece is performed using the robot 600, the processor 310 may store the shape and the weight of the workpiece in the memory 320 in advance and reproduce, in the virtual space, a state in which the robot 600 conveys the workpiece. Then, without causing the robot 600 to actually operate, the operator PS can determine whether the work for conveying the workpiece is appropriate. After changing the joint angles of the robot 600 in step S100, the processor 310 displays the image of the robot 600 in the virtual space in step S110. However, the processor 310 may display the image of the robot 600 in the virtual space after step S80 and, thereafter, determine whether to change the joint angles of the robot 600. In such a case, the display and the change may be repeated about a plurality of joint angles. In particular, in a robot having high redundancy flexibility like a vertical articulated robot, optimum joint angles can be selected out of the plurality of joint angles.

As explained above, in the embodiment, the position and the posture of the base 610 of the robot 600 are recognized from the image of the base section for teaching 110, the position and the posture of the finger section 630 of the robot 600 are recognized from the image of the finger section for teaching 130, the angles of the joints of the robot 600 are calculated using the positions and the postures, and the three-dimensional image of the robot 600 represented by the calculated angles of the joints is displayed in the virtual space. Therefore, without actually setting the robot 600 or causing the robot 600 to operate, the operator PS can easily understand to what kind of a state the robot arm 620 changes and can perform teaching of the robot 600.

In the embodiment explained above, the three-dimensional images of the robot 600 and the peripheral object PB are displayed as virtual reality using the AR glasses 400. However, instead, images of the robot 600 and the peripheral object PB may be displayed in the virtual space using the display section 350 that displays a two-dimensional image. In this case as well, the image of the robot 600 is displayed in the virtual space as in the case in which the AR glasses 400 are used. However, if the three-dimensional image of the robot 600 is displayed in augmented reality using the AR glasses 400, there is an advantage that the operator PS can easily understand the posture of the robot 600.

OTHER EMBODIMENTS

The present disclosure is not limited to the embodiment explained above and can be realized in various aspects in a range not departing from the gist of the present disclosure. For example, the present disclosure can also be realized in aspects described below. Technical features in the embodiment corresponding to technical features in the aspects described below can be replaced or combined as appropriate in order to solve a part or all of the problems of the present disclosure or achieve a part or all of the effects of the present disclosure. If the technical features are not explained as essential technical features in this specification, the technical features can be deleted as appropriate.

According to a first aspect of the present disclosure, there is provided a robot image display method. The display method includes: (a) a step of acquiring a base section image created by photographing a base section for teaching for teaching a position and a posture of a base of a robot and of recognizing the position and the posture of the base from the base section image; (b) a step of acquiring a finger section image created by photographing a finger section for teaching for teaching a position and a posture of a finger section of the robot and of recognizing the position and the posture of the finger section from the finger section image; (c) a step of calculating angles of joints of the robot from the position and the posture of the base recognized in the step (a) and the position and the posture of the finger section recognized in the step (b); and (d) a step of displaying, in a virtual space, a three-dimensional image of the robot represented by the angles of the joints calculated in the step (c).

With the display method, without actually setting the robot or causing the robot to operate, an operator can easily understand to what kind of a state a robot arm changes and perform teaching of the robot.

(2) In the display method, the step (c) may include: (i) a step of calculating, in a robot coordinate system, a position of a control point set in the finger section from the position and the posture of the base recognized in the step (a) and the position and the posture of the finger section recognized in the step (b); and (ii) a step of changing a model of the robot when the position of the control point in the robot coordinate system is outside a movable range of the robot.

With the display method, when the control point of the finger section is outside the movable range of the robot, it is possible to put the control point of the finger section within the movable range of the robot by changing the model of the robot.

(3) In the display method, the step (ii) may include: presenting, as the model of the robot, to an operator, one or more models in which the position of the control point in the robot coordinate system is within the movable range of the robot; and adopting a model selected by the operator out of the one or more models.

With the display method, it is possible to easily change the model of the robot.

(4) In the display method, the step (c) may include an angle changing step for, when a plurality of combinations are possible as a combination of the angles of the joints, selecting one combination out of the plurality of combinations and changing the combination.

With the display method, it is possible to select a preferable state as a state of the robot arm.

(5) In the display method, an operator may perform the selection of the combination of the angles of the joints.

With the display method, the operator can freely select a preferable state of the robot arm.

(6) In the display method, the angle changing step may include an interference eliminating step for, when a shape of a robot arm represented by the angles of the joints calculated in the step (c) is in an interference state in which the shape of the robot arm interferes with a peripheral object, eliminating the interference state by changing the combination of the angles of the joints while maintaining the position and the posture of the finger section.

With the display method, it is possible to reduce possibility of the robot arm and the peripheral object interfering with each other.

(7) In the display method, the interference eliminating step may include: calculating a distance between the peripheral object represented by a three-dimensional data of the peripheral object and the shape of the robot arm represented by the angles of the joints calculated in the step (c); and determining that the shape of the robot arm is in the interference state when the distance is equal to or smaller than a predetermined threshold and automatically determining a combination of the angles of the joints for eliminating the interference state while maintaining the position and the posture of the finger section.

With the display method, it is possible to automatically eliminate the interference of the robot arm and the peripheral object.

(8) The display method may further includes displaying the three-dimensional image in a superimposed manner on the base section for teaching and the finger section for teaching as augmented reality in the step (d).

With the display method, since the robot arm is displayed as augmented reality, the operator can easily understand to what kind of a state the robot arm changes.

(9) In the display method, a first mark used to recognize the position and the posture of the base of the robot may be provided in the base section for teaching, and a second mark used to recognize the position and the posture of the finger section of the robot may be provided in the finger section for teaching.

With the display method, it is possible to easily recognize the position and the posture of the base and the position and the posture of the finger section using the first mark and the second mark.

(10) In the display method, each of the first mark and the second mark may include a two-dimensional code, a projection, a recess, a light emitting section, or a printed pattern.

With the display method, it is possible to easily recognize the position and the posture of the base and the position and the posture of the finger section from the first mark and the second mark.

(11) According to a second aspect of the present disclosure, there is provided a computer program for performing display processing for a robot image. The computer program causes a processor to execute: (a) processing for acquiring a base section image created by photographing a base section for teaching for teaching a position and a posture of a base of a robot and for recognizing the position and the posture of the base from the base section image; (b) processing for acquiring a finger section image created by photographing a finger section for teaching for teaching a position and a posture of a finger section of the robot and for recognizing the position and the posture of the finger section from the finger section image; (c) processing for calculating angles of joints of the robot from the position and the posture of the base recognized in the processing (a) and the position and the posture of the finger section recognized in the processing (b); and (d) processing for displaying, in a virtual space, a three-dimensional image of the robot represented by the angles of the joints calculated in the processing (c).

With the computer program, without actually setting the robot or causing the robot to operate, an operator can easily understand to what kind of a state a robot arm changes and perform teaching of the robot.

(12) According to a third aspect of the present disclosure, there is provided a display system for a robot image. The display system includes: a base section for teaching for teaching a position and a posture of a base of a robot; a finger section for teaching for teaching a position and a posture of a finger section of the robot; a photographing section for photographing the base section for teaching and the finger section for teaching; and a control section connected to the photographing section. The control section executes: (a) processing for acquiring a base section image created by photographing the base section for teaching using the photographing section and for recognizing the position and the posture of the base from the base section image; (b) processing for acquiring a finger section image created by photographing the finger section for teaching using the photographing section and for recognizing the position and the posture of the finger section from the finger section image; (c) processing for calculating angles of joints of the robot from the position and the posture of the base recognized in the processing (a) and the position and the posture of the finger section recognized in the processing (b); and (d) processing for displaying, in a virtual space, a three-dimensional image of the robot represented by the angles of the joints calculated in the processing (c).

With the teaching system, without actually setting the robot or causing the robot to operate, an operator can easily understand to what kind of a state a robot arm changes and perform teaching of the robot.

The present disclosure can be realized in various aspects other than the aspects described above. For example, the present disclosure can be realized in aspects of a robot system including a robot and a control device, a computer program for realizing functions of the control device for the robot, and a non-transitory storage medium recording the computer program.

What is claimed is:

1. A display method for causing a processor to execute a process, the display method comprising executing on the processor the steps of:

adopting a first model of a plurality of models of a robot, the first model being selected by an operator among the plurality of models;

acquiring a teaching base image created by photographing only a teaching base section while the teaching base section is placed at a teaching table in a real space, the teaching base section corresponding to a base of the robot located in the real space, the teaching base section being provided in addition to the base of the robot;

recognizing a first position and a first posture of the base of the robot based on the teaching base image;

creating a virtual base image of a virtual robot in a virtual space based on the first position and the first posture;

acquiring a teaching finger image created by photographing only a teaching finger section while the teaching finger section is held by the operator and placed above the teaching table in the real space, the teaching finger section corresponding to a finger of the robot, the teaching finger section being provided in addition to the finger of the robot;

recognizing a second position and a second posture of the finger of the robot based on the teaching finger image;

creating a virtual finger image of the virtual robot in the virtual space based on the second position and the second posture;

calculating angles of a plurality of joints of an arm of the robot based on the first position, the first posture, the second position, and the second posture;

creating a virtual arm of the virtual robot in the virtual space, the virtual arm having a plurality of virtual joints respectively positioned in consideration of the calculated angles; and displaying, in the virtual space, a three-dimensional image of the virtual robot having the created virtual base image, the created virtual finger image, and the created virtual arm, wherein, in the calculating of the angles:
  a position of a control point set in the finger of the robot is calculated in a robot coordinate system from the first position and the first posture of the base of the robot and the second position and the second posture of the finger of the robot;
  the processor is further configured to determine whether the position of the control point in the robot coordinate system is outside a movable range of the first model of the robot; and
  the first model of the robot is changed under a condition in which the position of the control point in the robot coordinate system is outside the movable range of the first model of the robot, and wherein the display method further including executing on the processor the steps of:
  presenting one or more models of the plurality of models of the robot in which the position of the control point in the robot coordinate system is within the movable range of the robot- to the operator; and
  adopting another model, the another model being selected by the operator among the presented one or more models of the plurality of models of the robot.

2. The display method according to claim 1, wherein the calculating of the angles includes:
  when a plurality of combinations are possible as a combination of the angles of the joints, selecting one combination out of the plurality of combinations and changing the angles.

3. The display method according to claim 2, wherein the selection of the one combination of the angles of the joints is performed the operator.

4. The display method according to claim 2, wherein when a shape of the arm of the robot represented by the angles of the joints is in an interference state in which the shape of the arm interferes with a peripheral object, the interference state is eliminated by changing the combination of the angles of the joints while maintaining the second position and the second posture of the finger.

5. The display method according to claim 4, wherein when the interference state is eliminated,
  a distance between the peripheral object represented by a three-dimensional data of the peripheral object and the shape of the arm in which the joints are at the calculated angles,
  it is determined that the shape of the arm is in the interference state when the distance is equal to or smaller than a predetermined threshold, and
  a combination of the angles of the joints for eliminating the interference state is automatically determined while maintaining the second position and the second posture of the finger.

6. The display method according to claim 1, wherein the three-dimensional image of the virtual robot is displayed in a superimposed manner on the created virtual base image and the created virtual finger as augmented reality in the virtual space.

7. The display method according to claim 1, wherein a first mark used to recognize the first position and the first posture of the base of the robot is provided in the teaching base section, and
a second mark used to recognize the second position and the second posture of the finger of the robot is provided in the teaching finger section.

8. The display method according to claim 7, wherein each of the first mark and the second mark includes a two-dimensional code, a projection, a recess, a light emitting section, or a printed pattern.

9. A non-transitory recording medium recording a computer program for causing a computer to execute a process by a processor so as to perform the steps of:
  adopting a first model of a plurality of models of a robot, the first model being selected by an operator among the plurality of models;
  acquiring a teaching base image created by photographing only a teaching base section while the teaching base section is placed at a teaching table in a real space, the teaching base section corresponding to a base of the robot located in the real space, the teaching base section being provided in addition to the base of the robot;
  recognizing a first position and a first posture of the base of the robot based on the teaching base image;
  creating a virtual base image of a virtual robot in a virtual space based on the first position and the first posture;
  acquiring a teaching finger image created by photographing only a teaching finger section while the teaching finger section is held by the operator and placed above the teaching table in the real space, the teaching finger section corresponding to a finger of the robot, the teaching finger section being provided in addition to the finger of the robot;
  recognizing a second position and a second posture of the finger of the robot based on the teaching finger image;
  creating a virtual finger image of the virtual robot in the virtual space based on the second position and the second posture;

calculating angles of a plurality of joints of an arm of the robot based on the first position, the first posture, the second position, and the second posture;
creating a virtual arm of the virtual robot in the virtual space, the virtual arm having a plurality of virtual joints respectively positioned in consideration of the calculated angles; and
displaying, in the virtual space, a three-dimensional image of the virtual robot having the created virtual base image, the created virtual finger image, and the created virtual arm,
wherein, in the calculating of the angles:
a position of a control point set in the finger of the robot is calculated in a robot coordinate system from the first position and the first posture of the base of the robot and the second position and the second posture of the finger of the robot;
the processor is further configured to determine whether the position of the control point in the robot coordinate system is outside a movable range of the first model of the robot; and
the first model of the robot is changed under a condition in which the position of the control point in the robot coordinate system is outside the movable range of the first model of the robot, and
wherein the processor is further configured to:
present one or more models of the plurality of models of the robot in which the position of the control point in the robot coordinate system is within the movable range of the robot to the operator; and
adopt another model, the another model being selected by the operator among the presented one or more models of the plurality of models of the robot.

10. A display system comprising:
a display;
a camera;
a processor configured to be programed to:
adopt a first model of a plurality of models of a robot, the first model being selected by an operator among the plurality of models;
acquire a teaching base image created by photographing only a teaching base section via the camera while the teaching base section is placed at a teaching table in a real space, the teaching base section corresponding to a base of the robot located in the real space, the teaching base section being provided in addition to the base of the robot;
recognize a first position and a first posture of the base of the robot based on the teaching base image;
create a virtual base image of a virtual robot in a virtual space based on the first position and the first posture;
acquire a teaching finger image created by photographing only a teaching finger section via the camera while the teaching finger section is held by the operator and placed above the teaching table in the real space, the teaching finger section corresponding to a finger of the robot, the teaching finger section being provided in addition to the finger of the robot;
recognize a second position and a second posture of the finger of the robot based on the teaching finger image;
create a virtual finger image of the virtual robot in the virtual space based on the second position and the second posture;
calculate angles of a plurality of joints of an arm of the robot based on the first position, the first posture, the second position, and the second posture;
create a virtual arm of the virtual robot in the virtual space, the virtual arm having a plurality of virtual joints respectively positioned in consideration of the calculated angles; and
display on the display, in a virtual space, a three-dimensional image of the virtual robot having the created virtual base image, the created virtual finger image, and the created virtual arm,
wherein, in the calculation of the angles:
a position of a control point set in the finger of the robot is calculated in a robot coordinate system from the first position and the first posture of the base of the robot and the second position and the second posture of the finger of the robot;
the processor is further configured to determine whether the position of the control point in the robot coordinate system is outside a movable range of the first model of the robot; and
the first model of the robot is changed under a condition in which the position of the control point in the robot coordinate system is outside the movable range of the first model of the robot, and
wherein the processor is further configured to:
present one or more models of the plurality of models of the robot in which the position of the control point in the robot coordinate system is within the movable range of the robot to the operator; and
adopt another model, the another model being selected by the operator among the presented one or more models of the plurality of models of the robot.

\* \* \* \* \*